A. HARROLD.
GEAR FOR TRACTION ENGINES.
APPLICATION FILED OCT. 2, 1908.
Reissued Mar. 23, 1909.
12,930.
3 SHEETS—SHEET 1.
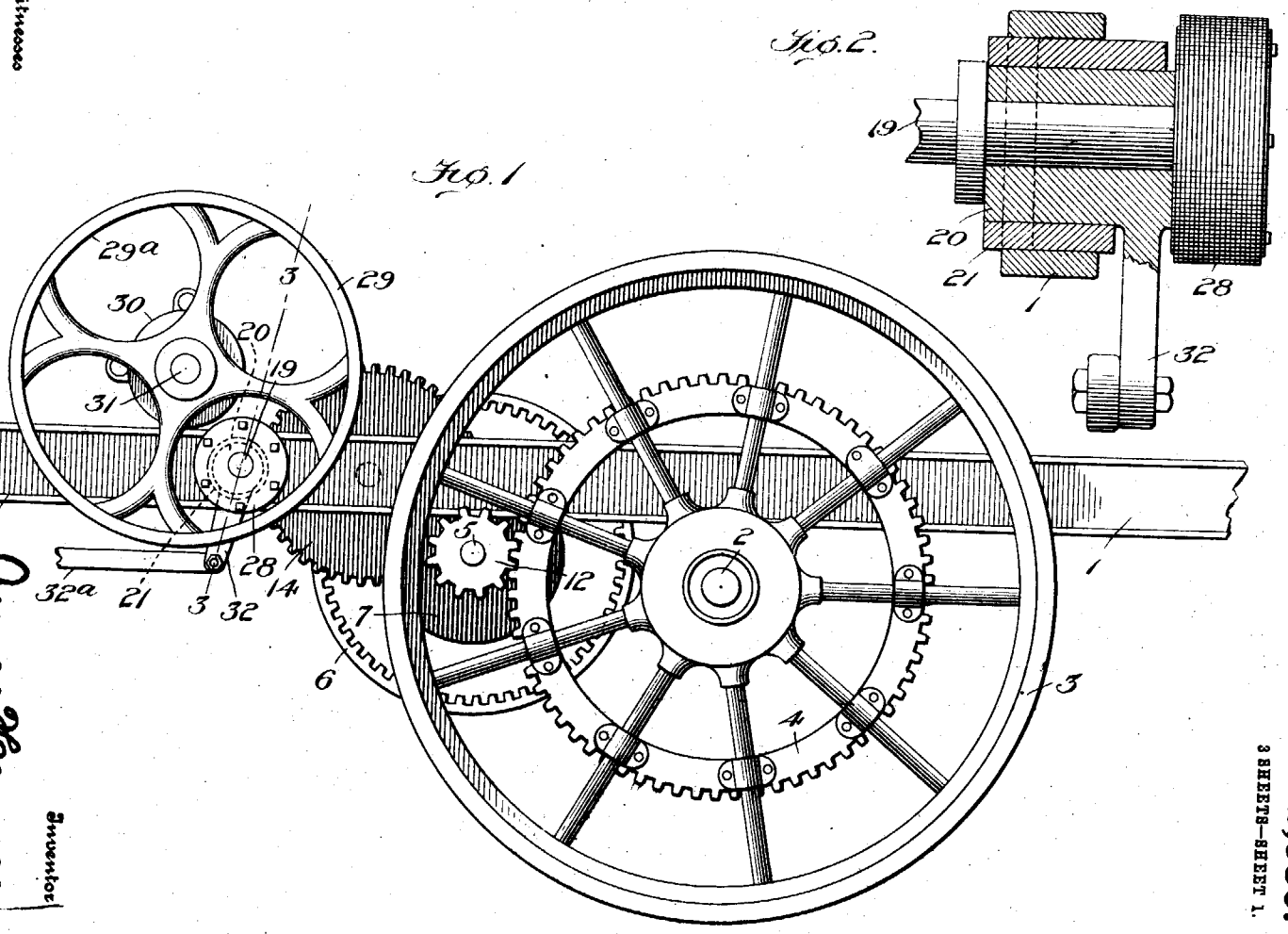
Witnesses
Edwin L. Bradford
Wallace Kenny
Inventor
Amos Harrold
By
Wm. O. Dyer
Attorney

A. HARROLD.

GEAR FOR TRACTION ENGINES.

APPLICATION FILED OCT. 2, 1908.

Reissued Mar. 23, 1909.

12,930.

3 SHEETS—SHEET 2.

Witnesses

Edwin L. Bradford

Wallace Greene

Inventor

Amos Harrold,

By Wm. E. Dyre.

Attorney

A. HARROLD.

GEAR FOR TRACTION ENGINES.

APPLICATION FILED OCT. 2, 1908.

Reissued Mar. 23, 1909.

12,930.

3 SHEETS—SHEET 3.

Witnesses

Edwin L. Bradford

Wallace Irvine

Inventor

Amos Harrold

By Wm. C. Dyre

Attorney

UNITED STATES PATENT OFFICE.

AMOS HARROLD, OF DELAWARE, OHIO.

GEAR FOR TRACTION-ENGINES

No. 12,930. Specification of Reissued Letters Patent. Reissued Mar. 23, 1909.

Original No. 850,644, dated April 16, 1907, Serial No. 197,164. Application for reissue filed October 2, 1908. Serial No. 455,935.

*To all whom it may concern:*

Be it known that I, AMOS HARROLD, a citizen of the United States, residing at Delaware, in the county of Delaware and State of Ohio, have invented certain new and useful Improvements in Gears for Traction-Engines, of which the following is a specification.

My invention relates to improvements in gears for traction-engines, whereby different speeds are provided and frictional contact between the power-shaft and the gearing communicating motion to the propelling-axle together with certain details of construction, all of which will be fully explained by reference to the accompanying drawings, in which—

Figure 3:
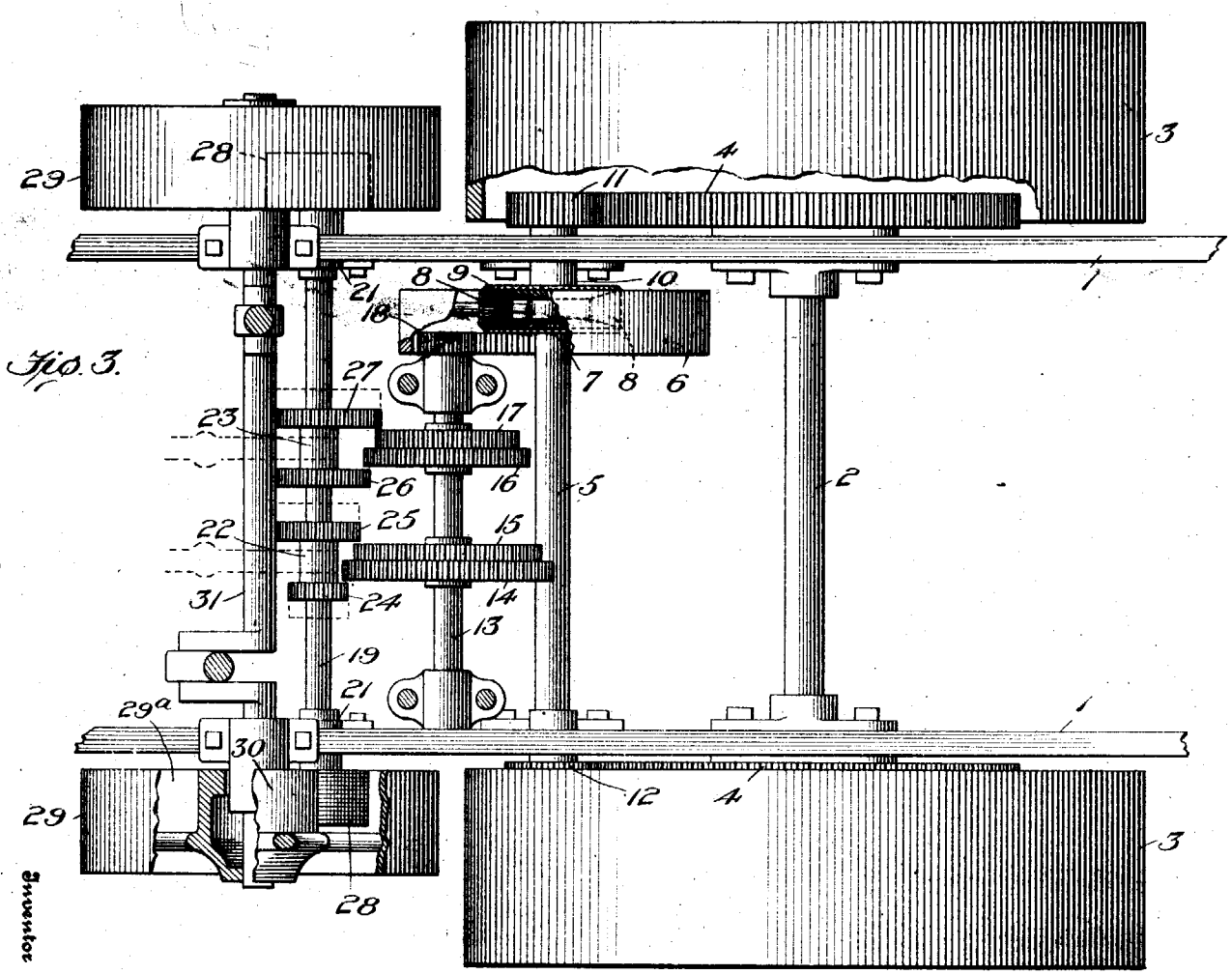
Figure 4:
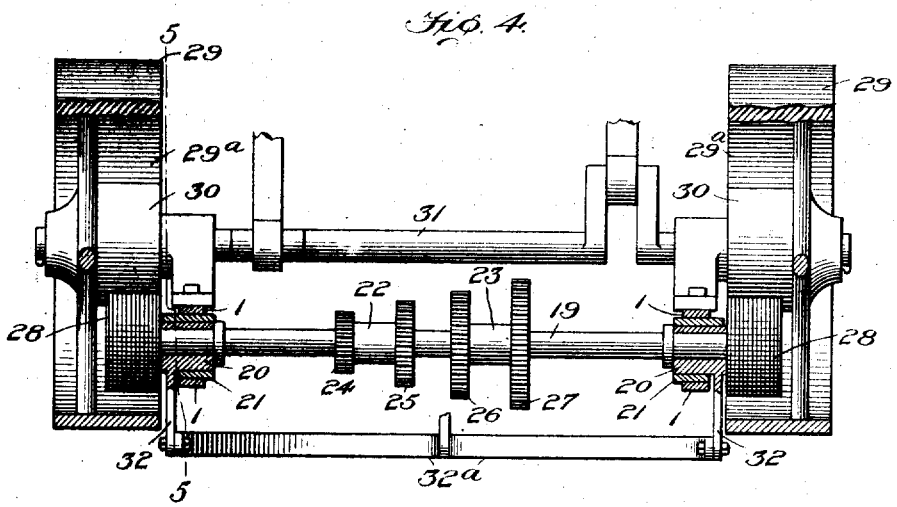
Figure 5:
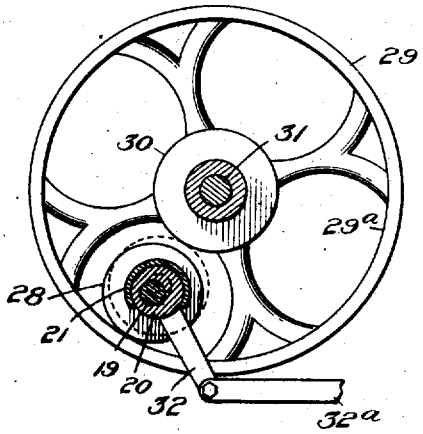
Figure 6:
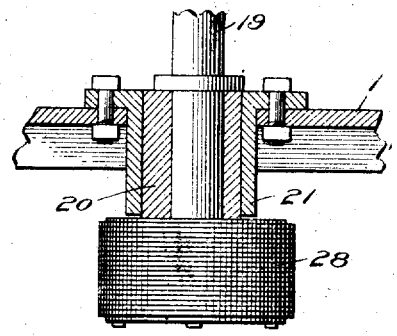

Figure 1 is a side elevation. Fig. 2 is a transverse section through line 3; 3, Fig. 1. Fig. 3 is a top view showing the relation of the various gears and their arrangement. Fig. 4 is a transverse section through the friction-gear and coöperating parts on the line 3—3, Fig. 1. Fig. 5 is a vertical section on the line 5—5, Fig. 4. Fig. 6 is a horizontal section through one eccentric and its bearing.

Similar numerals of reference indicate like parts in all the figures of the drawings.

1 represents a portion of the engine-frame which may be constructed in any well-known manner, reference being had to properly attaching and locating the various parts pertaining to the present invention.

2 represents the traction-axle which is journaled to the frame in the ordinary manner. To the traction-axle 2 are attached the traction or propelling wheels 3, and to the wheels 3 are securely attached the gear-wheels 4, which gear-wheels may be attached to the spokes of the traction-wheels 3, as shown in Fig. 1; or they may be otherwise attached, inasmuch as the only object desired is to provide suitable attachment between the traction-wheels and the gear-wheels. To the frame 1 is journaled the compensating-gear shaft 5, upon which shaft is loosely mounted the internal gear-wheel 6, to the side of which is located the bevel-gear 7, which bevel-gear is fixed upon said shaft 5 and meshes with the gear-pinion 8, which gear-pinion is pivotally carried by the said internal gear 6, and meshes with the loosely-mounted bevel-gear 9, said bevel-gear 9 being fixed to the sleeve 10, and upon which sleeve 10 is fixed the pinion 11, which pinion meshes with the gear-wheel 4. The parts just above described constitute what might be termed an ordinary "compensating" gear and form no particular part of the present invention.

It will be understood that upon the opposite end of the shaft 5 is securely fixed the pinion 12, which meshes with one of the gear-wheels 4. To the frame 1 is journaled the shaft 13, and upon which shaft are mounted the differentiating gear-wheels 14, 15, 16, and 17, said wheels being fixed to and rotating with the secondary shaft 13. Upon the shaft 13 is mounted the pinion 18, which pinion meshes with the internal gear-wheel 6. The counter shaft 19 is journaled in the eccentric bearings 20, which eccentric bearings are supported and carried by suitable casings 21, which casings are fixed in any convenient and well-known manner to the frame 1 or its equivalent.

Upon the shaft 19 are slidably mounted the sleeves 22 and 23, and to said sleeves are securely attached or formed integral therewith the differentiating pinions 24, 25, 26, and 27, said pinions being located and arranged substantially as illustrated in the drawings and all for the purpose hereinafter described. The pinions 24 and 25 are moved in unison and likewise the pinions 26 and 27. The pinions 24, 25, 26, and 27 are so located and arranged with reference to the gear-wheels 14, 15, 16, and 17 that they can be thrown in and out of mesh at the will of the operator, by which arrangement four distinct and independent speeds are provided. It will be understood that when the pinion 24 is brought in mesh with the gear-wheel 14 the slowest speed is obtained and when the pinion 27 is brought in mesh with the gear-wheel 17 the highest speed is maintained. The other pinions and gear-wheels provide or produce various speeds between the highest and lowest. For convenience the pinions, together with their sleeves located upon the shaft 19, can be so arranged that they can all be thrown out of mesh, which is the position illustrated in Fig. 3.

Upon the shaft 19 are securely fixed the friction-wheels 28. Said friction-wheels are of the usual construction and are located between the inner surfaces of the wheels 29 and the outer surfaces of the hubs 30, which hubs are preferably formed integral with the wheels 29, said hubs and wheels being securely fixed to the power or engine shaft 31.

It will be understood that by my peculiar arrangement I am enabled to rotate the shaft 19 in opposite direction by shifting the friction-wheels 28 from contact with the inner surfaces of the wheels 29 to the outer surfaces of the hubs 30, this being accomplished by means of suitable arms 32, fixed to or formed integral with the eccentric bearings 20 and the operating-bars pivoted to the outer free ends of the arms 32. The eccentric bearings 20 are operated to throw the shaft 19 by means of a suitable operating-lever, which may be of any well known construction and forms no particular part of the present invention and no illustration is deemed necessary.

The friction-wheels 28 may be detached or disconnected or brought out of contact with the inner surfaces of the wheels 29 and the peripheries of the hubs 30, at which time no operative connection is maintained between the engine-shaft 31 and the various gears or propelling mechanism, this being very desirable, especially in gasolene traction-engines, owing to the fact that gasolene engines cannot well be started under a load or at the time they are to perform the work designed to be accomplished.

It will be understood that when the friction-wheels are in contact with the inner surfaces of the wheels 29 the engine proper will be propelled in one direction and when said friction-wheels are brought into contact with the hub 30 the engine will be propelled in the opposite direction, by which arrangement the engine proper can be propelled forward or backward, and, as designed in the present instance, the backward movement is brought about by contact with the hubs 30, which brings about a slow movement owing to the fact that the hubs 30 are of less diameter than the diameter of the wheels 29.

For the purpose of maintaining proper mesh as between the gear-wheels 14, 15, 16, and 17, and the pinions 24, 25, 26, and 27 the mesh is maintained in a horizontal line drawn through the shafts 13 and 19, or substantially so, and substantially a vertical movement imparted to the shaft 19, by which arrangement the pinions and gear-wheels above mentioned are not thrown out of mesh at any time during the movement of the shaft 19 by means of the eccentric bearings 20.

The operation of my invention in its preferred form of construction, when employed in connection with a gasolene engine or other motor running always in the same direction and usually at the same rate of speed, is substantially as follows: Power shaft 31 of the motor or prime-mover constantly rotated in one direction carries with it the duplicate fly-wheels 29, 29 securely keyed upon opposite ends thereof. As shown by the drawings, the inner surfaces 29ª and central hubs 30 of these wheels constitute internal and external friction-surfaces concentrically arranged and preferably in the form of annular inwardly projecting flanges. Between these flanges of each wheel 29 are located corresponding friction-wheels 28, 28 of any suitable material or composition, and of a diameter somewhat less than the radial distance between said flanges or friction-surfaces with which they are adapted to alternately engage. Rigidly connecting the said friction-wheels 28, 28 is the counter-shaft 19 eccentrically mounted in opposite sides of the main supporting frame 1. Obviously in this, or substantially this relation of parts, a slight oscillatory movement in one direction of the pivoted arms 32, by agency of any suitable operating lever, such as 32ª, acting through the double eccentric bearings 20, 20 depresses the counter-shaft 19 whereupon both friction-wheels 28, 28 are brought into contact with, and derive power from, the oppositely arranged friction-surfaces 29ª, 29ª, and are revolved at a comparatively rapid rate of speed. On the other hand a reverse movement of said pivoted arms 32 acting through the eccentrics 20, 20 elevates shaft 19 bringing the wheels 28, 28 into contact with the hubs or external friction-surfaces 30, 30 revolving at a comparatively low rate of speed; and, whether the rate of speed be fast or slow, forward or backward, power is thus transmitted from shaft 31 of the prime-mover to the counter-shaft 19 at will of the operator under control of a single lever, and thence through suitable gearing to the traction or ground-wheels 3, 3 of the vehicle.

In addition to these advantages it will be understood that the forward drive of the vehicle is obtained by bringing the counter-shaft friction-wheels 28, 28 simultaneously into contact with their respective internal-friction surfaces 29ª, 29ª of both fly or friction wheels 29, 29 on the main power shaft 31. This gives an increased area of frictional contact, there being less pressure required to insure the transmission of power, the consequent strains on all bearings arising from this pressure being correspondingly reduced and more uniformly distributed. Moreover, it is well known that the forward drive in vehicles of this class—particularly traction-engines—is used to a much greater extent than the comparatively slow rear drive, the latter being only of occasional use, so that the bearings have the least strain upon them when the parts are in the position of general use. A still further advantage of the double construction illustrated resides in the fact that vibrations of the engine or prime-mover are reduced to a minimum, the connection of the gearing with the fly or friction wheels being such as to absorb the shocks of heavy explosions, and assist materially in equalizing the strains and vibrations incident to motors of the class described. As aforesaid, the counter-shaft 19 is operatively connected with the traction or ground-wheels 3, 3 by suitable gearing, that illustrated by the present drawings involving both variable-speed and compensating gears, whereby the power derived from shaft 19 is transmitted through shiftable pinions 24, 25, 26 or 27 splined thereto and rotatable therewith, to one or the other of the driven-gears 14, 15, 16 or 17 secured to the intermediate shaft 13. From the latter or secondary shaft 13, driven thus in either direction, the power is next transmitted through its pinion 18 to the internal gear 6 loosely mounted with relation to the compensating-gear-shaft 5, thence by pinions 8, 8 to gears 7, 9 fixed respectively, upon said shaft 5 and sleeve 10. Thus under ordinary conditions the aforesaid elements 5, 6, 7, 8, 8, 9 and 10 rotate in cluster with shaft 5 as an axis, to drive pinions 11 and 12, and through them the main gears 4, 4 affixed to the ground-wheels 3, 3. On the other hand, a turn of the vehicle one way or the other, necessarily retards one ground-wheel 3 whereupon, as in compensating gears generally, there is a relative rotary movement of gears 7 and 9, the intermediate pinions 8, 8 at such times revolving axially more or less according to the radii of the curves described by the ground-wheels.

Thus the operation of the invention in its preferred form of construction contemplates the aforesaid duplicate arrangement of frictional driving and driven power-transmitting and reversing-gears, also positively driven variable speed-gears, and a suitable compensating-gear coöperatively interposed between the source of power and its point or points of utilization. And while such duplicate arrangement of the friction-gear is of great importance contributing in no small degree to the durability and general efficiency of the invention, same is not essential, as a single arrangement of such gears would produce an operative structure; and moreover, the variable-speed and compensating-gears, either or both of them may be omitted without departing from the spirit of the present invention.

Having thus described my invention, what I claim and desire to secure by Letters Patent is:

1. In a gear for traction-engines, the combination of a frame, an axle journaled in the frame, driven wheels secured to said axle, a gear fixed to each of said wheels, a compensating shaft, an internal gear loosely mounted thereon, a pinion fixed to said compensating shaft and meshing with one of the gears on the driven wheels, two beveled gears, mounted adjacent each other, a beveled gear carried by the internal gear interposed between said two beveled gears, a sleeve, one of said beveled gears fixed upon said compensating shaft and the other of said beveled gears located on the sleeve, a pinion on the sleeve which meshes with one of the gears on the driven wheels, a secondary-shaft journaled in the frame, different-sized gears fixed on the said secondary-shaft, a pinion on the secondary-shaft which meshes with the internal gear, a third shaft, sleeves slidably mounted on the third shaft, pinions of different diameters on the sleeves, said pinions adapted to mesh with the different-sized gears on the said secondary-shaft, eccentric bearings for the third shaft, friction-wheels fixed on the third shaft, an engine-shaft, wheels secured thereto having rims and hubs, the friction-wheels being located intermediate the hubs and inner surface of the rims of the wheels on the engine-shaft and adapted for alternate contact therewith.

2. In a gear for traction-engines, the combination of a frame, an axle journaled in the frame, driven wheels secured to said axle, a gear fixed to each driven wheel, eccentric bearings, a shaft mounted in said eccentric bearings, different-sized gears and friction-wheels on the latter shaft, an engine-shaft, wheels mounted on the engine-shaft, the friction-wheels on the eccentrically-mounted shaft being located between the hubs and rims of the wheels on the engine-shaft, a secondary-shaft, different-sized gears mounted on the last named shaft, said latter gears adapted to mesh with the first-mentioned different-sized gears, a compensating-gear shaft, a pinion mounted on the latter shaft and meshing with the gear fixed to one of the driven wheels, an internal gear mounted on the compensating-gear shaft, a pinion on the secondary-shaft, said latter pinion meshing with the internal gear, a sleeve on the compensating-gear shaft, a pinion mounted on the sleeve, said pinion meshing with the gear fixed to one of the driven wheels, a beveled gear mounted on the sleeve, a beveled-gear wheel revolving with the compensating-gear shaft, and a beveled pinion carried by the internal gear between the beveled gears on the sleeve and the compensating shaft.

3. In a gear for traction-engines, the combination of an axle, driven wheels mounted on said axle, gears on the driven wheels, a compensating-gear shaft, a pinion mounted on the compensating-gear shaft, said pinion meshing with one of the gears on the driven wheels, a sleeve, a pinion on the sleeve, said pinion meshing with one of the gears on the driven wheels, a secondary-shaft, a pinion on the last named shaft, a series of different-sized gears on the secondary-shaft, gearing interposed between the pinion on the secondary-shaft and the pinions on the sleeve and compensating-gear shaft to revolve the latter and the sleeve, a shaft, a series of different-sized pinions on the latter shaft adapted to mesh with the different-sized gears on the secondary-shaft, friction-wheels on the shaft carrying the different-sized pinions, an engine-shaft, wheels with rims and hubs mounted on the engine-shaft, and means for engaging the friction-wheels with the hubs or rims of the wheels on the engine-shaft.

4. In a traction engine, the combination with a frame and driving ground-wheels supporting the same, of a power shaft for a prime mover mounted on said frame having a friction-wheel with concentric internal and external annular friction-surfaces, a counter-shaft provided with a friction-wheel located between said friction-surfaces and connected with the driving ground-wheels by suitable gearing, and means for relatively moving said shafts to bring the counter-shaft friction-wheel into contact with either the internal or external friction surface of the other friction-wheel, substantially as described.

5. In a traction-engine, the combination with a frame and driving ground-wheels supporting the same, of a power shaft for a prime mover mounted on said frame having a friction wheel with concentric internal and external annular friction-surfaces, a counter-shaft provided with a friction-wheel located between said surfaces and connected with the driving ground-wheels by suitable gearing, and means for moving said counter-shaft toward and from the other shaft to bring the counter-shaft friction-wheel into contact with either the internal or external friction surface of the other friction-wheel, substantially as described.

6. In a traction-engine, the combination with a frame and driving ground-wheels supporting the same, of a power shaft for a prime mover mounted on said frame having a friction-wheel with concentric internal and external annular friction-surfaces, a counter-shaft eccentrically mounted on said frame provided with a friction-wheel located between said surfaces and connected with the driving ground-wheels by suitable gearing, and means for moving said counter-shaft in its eccentric bearings toward and from the other shaft to bring the counter-shaft friction-wheel into contact with either the internal or external friction-surface of the other friction-wheel, substantially as described.

7. In a traction-engine, the combination with a frame and driving ground-wheels supporting the same, of a power shaft for a prime mover mounted on said frame and provided with a fly-wheel having concentric internal and external annular friction-surfaces, a counter-shaft provided with a friction-wheel located between said friction-surfaces and connected with the driving ground-wheels by suitable gearing, and means for relatively moving said shafts to bring the counter-shaft friction-wheel into contact with either the internal or external friction-surface of said fly-wheel, substantially as described.

8. In a traction-engine, the combination with a frame and driving ground-wheels supporting the same, of a power shaft for a prime mover mounted on said frame and having two friction wheels, each provided with concentric internal and external annular friction-surfaces on its inner face, a counter-shaft extending between said friction-wheels and having at each end a friction-wheel located between the friction-surfaces of the corresponding friction-wheel on the power shaft, said countershaft being connected with the driving ground-wheels by suitable gearing, and means for relatively moving said shafts to bring the counter-shaft friction-wheels into contact with either the internal or external friction-surfaces of the other friction-wheels, substantially as described.

In testimony whereof I have signed my name to this specification in the presence of two subscribing witnesses.

AMOS HARROLD.

Witnesses:
EUGENE S. OWEN,
F. A. OWEN.